Inventor:
WOLFGANG HOHORST
by Stephan H. Forslund, Atty

Feb. 17, 1970 W. HOHORST 3,496,521

SAFETY CONTACT TERMINAL FOR ELECTRIC WIRES

Filed May 29, 1967 6 Sheets-Sheet 6

3,496,521
SAFETY CONTACT TERMINAL FOR ELECTRIC WIRES
Wolfgang Hohorst, Minden, Westphalia, Germany, assignor to Wago-Kontakttechnik G.m.b.H.
Filed May 29, 1967, Ser. No. 641,752
Int. Cl. H01r *11/20*
U.S. Cl. 339—95 10 Claims

ABSTRACT OF THE DISCLOSURE

A safety contact terminal for joining electric wires, comprising a plastics insulating housing defining a pair of funnel-shaped wire-receiving apertures, a strip of conducting material located so as to extend between said apertures, and pressure members located within said housing, adapted to clamp said wires when inserted in said apertures, against said conducting strip.

The invention concerns an electric connecting terminal by means of which the ends of electric wires may be interconnected.

Connecting terminals are already known in which the electric wires may be pressed in between a displaceable yoke in an insulating housing, and a contact strip. This yoke may either be biased by a spring or by means of screws which press one leg of the yoke against the end of a lead and hence ensuring a current conducting connection.

It is an object of the invention to provide such a safety contact terminal which is equipped with an additional contact section, so that the terminal is adapted to receive printed circuits, strip conductors or like connecting devices in a recess of the housing. The terminal is easily manufactured, and is particularly safe in use, the ends of the wires being completely inserted in and covered by the terminal.

In accordance with the invention a safety contact terminal for electric wires is equipped with a pressure yoke clamping the ends of the wires in a plastic housing against a contact strip, and the housing is provided with oppositely located funnel-shaped openings for the wire ends. The pressure yokes may be fitted with downwardly extending linked straps, these straps partly covering the insert apertures to prevent incorrect insertion of the lead ends.

Figure 2:
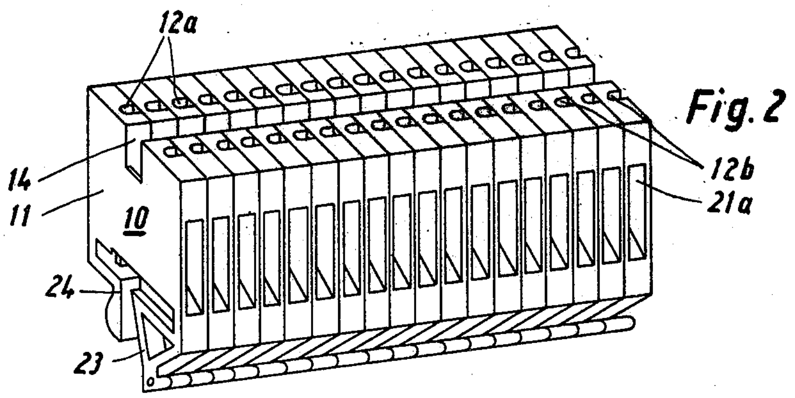
Figure 1:
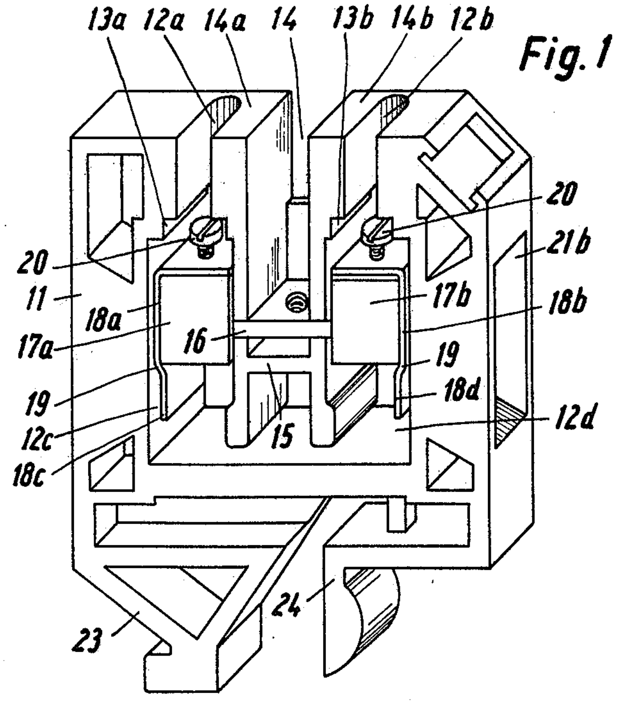
Figure 3:
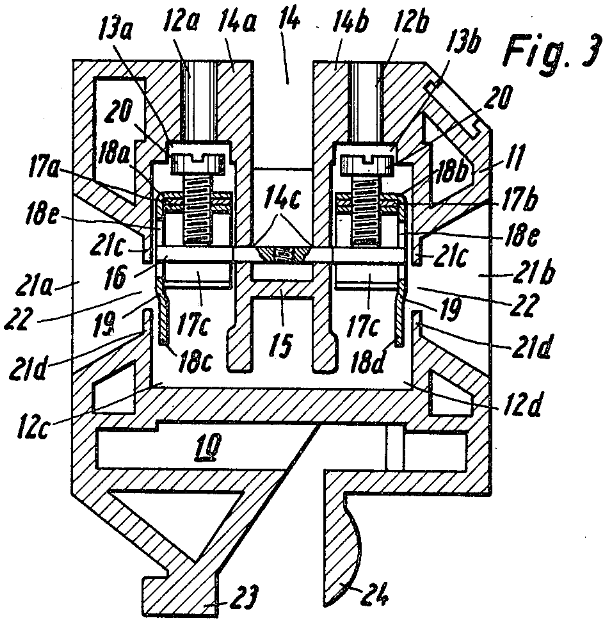
Figure 4:
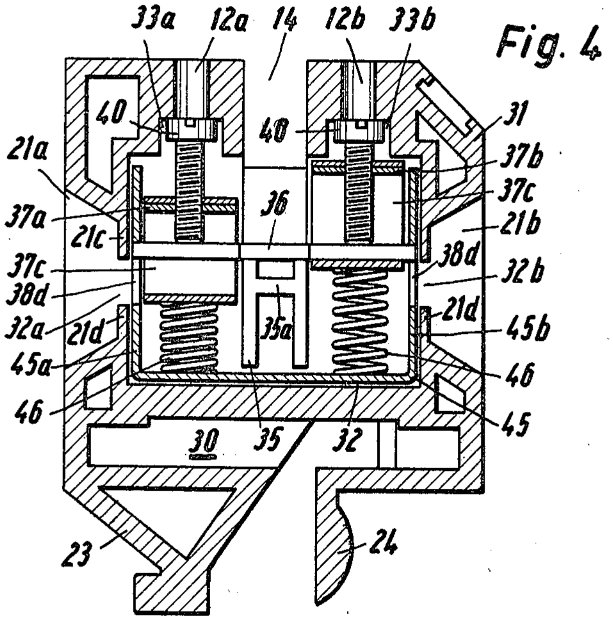
Figure 5:
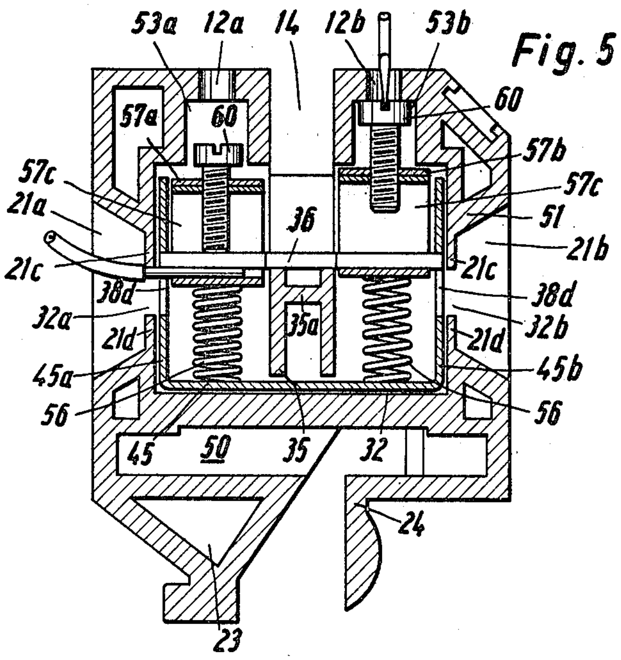
Figure 6:
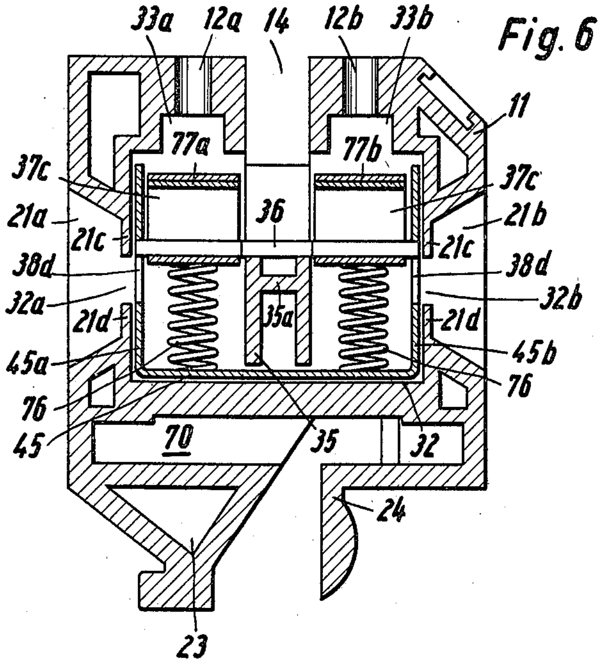
Figure 7:
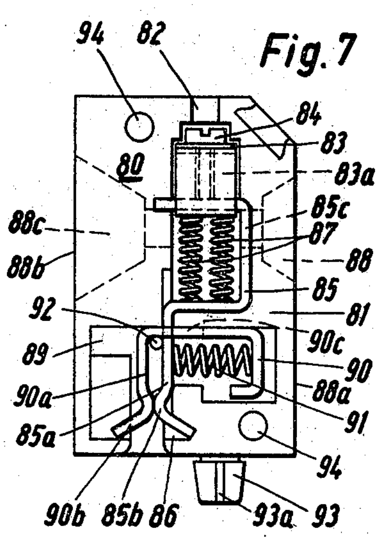
Figure 8:
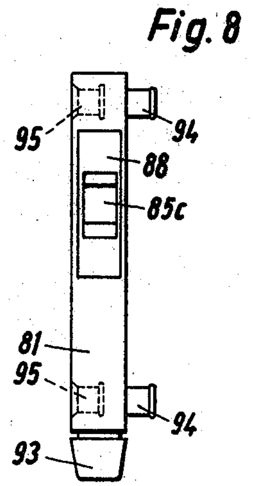
Figure 9:
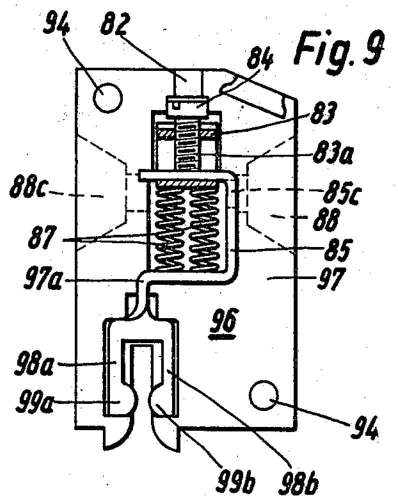
Figure 10:
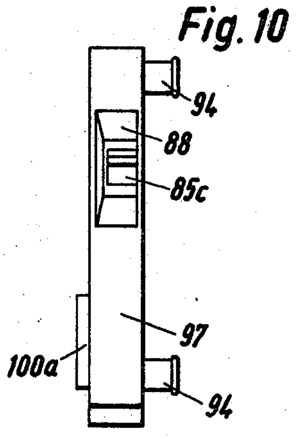
Figure 11:
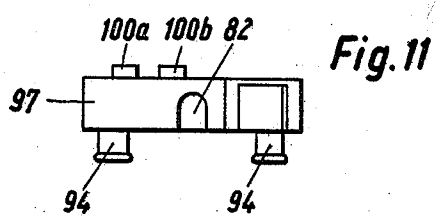
Figure 12:
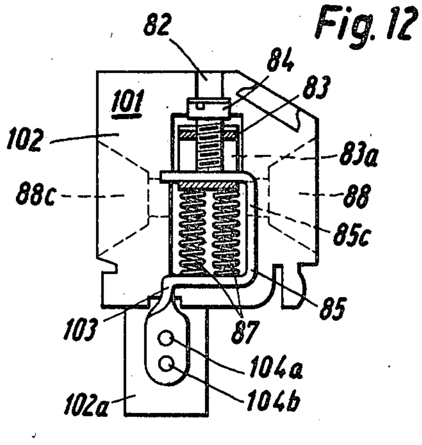
Figure 13:
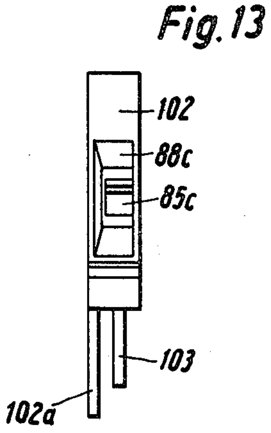
Figure 14:
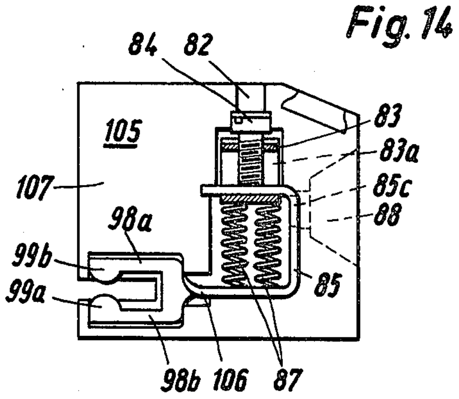
Figure 15:
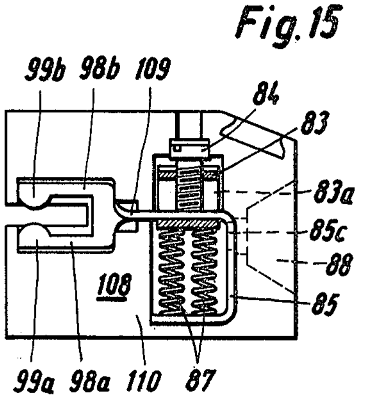
Figure 16:
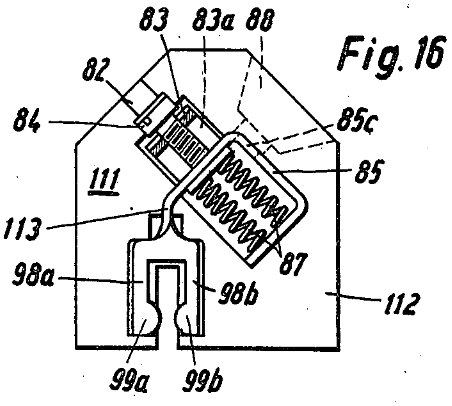
Figure 17:
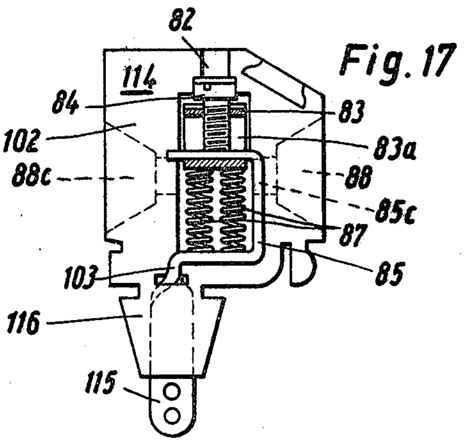
Figure 18:
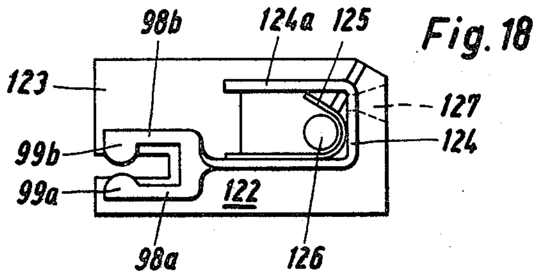
Figure 19:
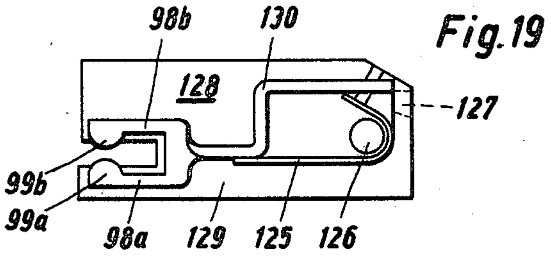
Figure 20:
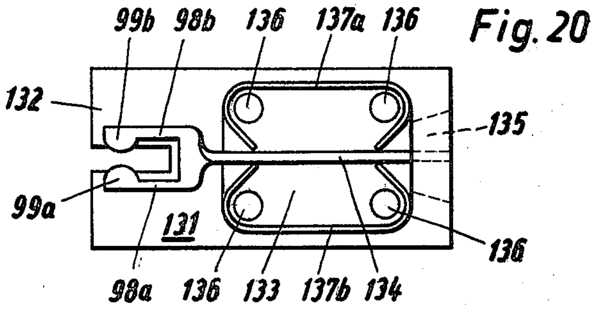

Reference should now be made to the accompanying drawings, in which:

FIG. 1 is a perspective view of a safety contact terminal,

FIG. 2 is a perspective view of a number of safety contact terminals of identical structure in juxtaposition, FIG. 3 is a vertical section through the same safety contact terminal of FIG. 1, FIG. 4 is a vertical section through a modified safety contact terminal, FIG. 5 is a vertical section through a further modified safety contact terminal, FIG. 6 is a vertical section through a further modified safety contact terminal, FIG. 7 is an end view of a safety contact terminal formed as a sequential strip conductor terminal, FIG. 8 is a side view of the same sequential strip conductor terminal, FIG. 9 is an end view of a sequential strip conductor terminal modified as a safety contact terminal, FIG. 10 is a side view of an identical modified sequential strip conductor terminal, FIG. 11 is a plan view of the same modified sequential strip conductor terminal, FIG. 12 is an end view of an alternative safety contact terminal, FIG. 13 is a side view of the same safety contact terminal, FIG. 14 is an end view of a safety contact terminal formed as a spring pressure strip conductor terminal, FIG. 15 is an end view of a modified spring pressure strip conductor terminal as a safety contact terminal, FIG. 16 is a front elevation of an alternative sequential assembly of a strip conductor terminal, FIG. 17 is a front elevation of an alternative safety contact terminal corresponding to FIG. 12, having a resting foot and soldering lug formed therein, FIG. 18 is a front elevation of a flat spring strip conductor terminal formed as a safety contact terminal, FIG. 19 is a front elevation of a further modified safety contact terminal and FIG. 20 is a front elevation of a flat spring strip conductor terminal modified as a safety contact terminal.

Referring to FIGURES 1, 2 and 3, a safety contact terminal 10 in its housing 11 made of plastics has two parallel recesses 12*a*, 12*b*, each of which widens in two steps 13*a*, 13*b*, terminating in a U-shaped recess 12*c*, 12*d*. Between these recesses 12*a*, 12*b* there is a parallel-sided recess 14 the walls of which are joined by a cross rib 15, making an H-shaped structure. Over the cross rib 15 and parallel thereto extends a contact strip 16 on which a frame-like yoke 17*a*, 17*b* is slid at each end the strip being located in the recesses 12*c*, 12*d*. Downwardly bent straps 18*a*, 18*b* engage over the yokes 17*a*, 17*b* at right angles relative to the outer edges, and are centrally connected thereto above the yokes 17*a*, 17*b* by means of screws 20, the straps 18*a*, 18*b* being held on the yokes 17*a*, 17*b* by means of a double bend 19. The intermediate walls 14*a*, 14*b* are resilient and clamp the contact strips 16 firmly but removably in the slots 14*c*.

The limbs 18*c*, 18*d* of the straps 18*a*, 18*b* projecting vertically downwards are provided above the bends 19 with a recess 18*e* in which the contact strip 16 engages. V-shaped slots 21*a*, 21*b* are formed in the housing 11 which at their constricted apertures 22 are each defined by two lugs 21*c*, 21*d*. The spacing between the two lugs 21*c*, 21*d* is equal to the size of the recess 18*e* of the strap 18*a*. Thus, the lug 21*c* is substantially flush with the underside of the contact strip 16.

At the base end the housing 11 a guide member 23 of triangular section is formed and opposite it is a segment-shaped limb 24 bent at right angles. These two members enable the safety contact terminal 10 to be mounted on a suitably formed profile rail or rod (not shown in the drawing) in juxtaposed sequence (see FIG. 2).

When such a safety contact terminal mounting 10 is to be used then the electric supply leads are inserted in the recesses 21*a* and 21*b* in the housing 11, until they extend into the recesses 18*e* of the straps 18*a*, 18*b* and into the frame-like yokes 17*a*, 17*b* and are supported against the intermediate wall 14*a* or 14*b*. Then by turning the screws 20 by means of a screw-driver, the yokes 17*a*, 17*b* are drawn against the fixed contact strip 16 and clamp the electric leads between the underside of the contact strip 16 and the underside of the yokes 17*a*, 17*b*. Hence a reliable electric connection is provided.

The length of each screw is such that in accordance with the distance between contact strip 16 and the steps 13*a*, 13*b* it leaves only a relatively small clearance for the movement of the yoke 17*a* or 17*b*.

The yokes 17*a*, 17*b* with limbs 18*c*, 18*d* slide upwards when the screws are tightened, and during this movement close the opening 22 between the two flaps 21*c*, 21*d* this preventing further additional electric leads from being inserted.

A modified embodiment of a safety contact terminal 30 show in FIG. 4, whilst being similar to that described above, has a U-shaped holding yoke 45*a* in recesses 32, 32*a* and 32*b*; there are also recesses 38*d* which engage the contact strip 36.

Frame-like yokes 37*a*, 37*b* with screws 40 are mounted so as to be vertically adjustable between the H-shaped intermediate walls 35 (with crosspiece 35*a*) and the limbs 45*a* and 45*b* of the holding yoke 45 at each end of the contact strip 36. Below the yokes 37*a*, 37*b* springs 46 urge the screws 40 upwards, and serve to clamp the electric lead-in wires between the underside of the contact strip 36 and the underside of the yokes 37*a*, 37*b*. For detachment and/or renewed introduction of electric lead-in wires the screws 40 are screwed outwards in the yokes 37*a*, 37*b*. The screw-heads 40 are located in recesses 33*a*, 33*b* of the housing 31 and during unscrewing urge the yokes 37*a*, 37*b* downwards and expose their interiors 37*c*.

When the screw 40 is turned clockwise with a conductor inserted, the screw 40 goes slack when the conductor becomes clamped by spring pressure. With continued clockwise rotation of the screw 40 the pressure yoke 37*a*, 37*b* becomes a tension yoke, since the screw end is supported against the contact strip 36 and draws the tension yoke upwards. The screw 40 is thus preferably somewhat smaller than the space between the upper edge of the contact strip 36 and the lower edge of the recess 33*a*, 33*b* in the insulating housing 31.

The contact strip 36 mounted in the recesses 38*d* of the holding yoke 45 thus receives the pressure between the holding yoke 45 and the pressure yokes 37*a*, 37*b* produced by the springs 46.

A further modified embodiment of a safety contact terminal 50 is shown in FIG. 5. This is similar to the terminals already described, but has larger, widened recesses 53*a*, 53*b* in the housing 51 towards the upper end which gives the screws 60, sufficient space to enable them to be screwed out of the yokes 57*a*, 57*b* to a considerable extent, the yokes being pressed upwards by the springs 56.

To obtain a clamping connection of the electric lead-in wires between the contact strip 56 and the clamping yokes 57*a*, 57*b*, the screws 60 are screwed out by means of a screw-driver, and the yokes 57*a*, 57*b* are urged downwards so that the internal spaces 57*c* of the yokes 57*a*, 57*b* are exposed and the electric lead-in wires can be inserted lateral of the housing 51. In addition it is possible for the pressure of the springs 56 against the lead-in wires to be added to by screwing-in the screws 60.

A further modified embodiment of such a safety contact terminal 70 is shown in FIG. 6. Herein, no screws are provided in the yokes 77*a*, 77*b*, but the clamping of the electric lead-in wires is produced solely by the spring pressure of the springs 76.

The safety contact terminals as shown in FIGS. 1–6 are distinguished by simple manufacture, manifold applicability and high reliability, since the spring pressure is not transmitted to the housing but merely acts between the U-shaped holder and the horizontally disposed contact strip. This prevents any deformation of the housing even when it is warmed.

The lateral slot-shaped recesses 21*a*, 21*b* present considerable advantages from a manufacturing point of view, since plastics material injection into the manufacturing mold is facilitated by the use of side injection channels.

The safety contact terminal shown in FIGS. 7 and 8 formed as a unitable terminal strip section 80, the housing 81 of which is preferably made of plastics; this housing 81 has an upper vertical extending recess 82. This recess is formed to receive a frame-like pressure yoke 83 into which a screw 84 is screwed from above; since its heads is supported against the insulation, then when turned anti-clockwise, it positively moves the pressure yoke 83 downwards. A U-shaped contact strip 85 is disposed below this pressure yoke 83 in its interior 83*a*, the downwardly bent limb 85*a* of which is provided with a bent-out portion 85*b*; its end is supported in a recess 85 of the housing 81. In the U-shaped member of the contact strip 85 two upright springs 87 are provided which act on the underside of the yoke 83, urging it upwards. A recess 85*c* is formed in the U-shaped member of the contact strip 85 corresponding in height to an inserting slot 88 which is U-shaped and extends to the edge 88*a*. At the opposite side 88*b* an inserting slot 88*c* preferably somewhat larger is provided.

There is a U-shaped clamping yoke 90 in a substantially T-shaped recess 89 formed below the housing 81. This clamping yoke 90 has a bent portion 90*b* at the end on its limb 90*a* corresponding to the bent portion 85*b* of the contact strip 85. The limb 85*a* is inserted in the U-shaped part of the clamping yoke 90 through a recess 90*c*; this recess is such that the clamping yoke 90 may move horizontally; it has a horizontal spring 91 between the limb 85*a* and the clamping yoke 90.

To prevent the limb 85*a* of the contact strip 85 from being pressed out of its position by spring 91, a stop pin 92 arranged between this limb 85*a* and the limb 90*a* of the clamping yoke 90. A socket pin 93 projects below the housing 81 and is provided centrally with a vertical groove 93*a*; this serves as socket coupling for snap-mounting in an aperture of a mounting framework.

On the face of the housing 81 are two locating pins 94 which may be push-joined to an adjacent terminal by insertion in recesses 95.

Electric conductors are joined by unscrewing the screw 84 from the pressure yoke 83, causing it to be pressed downwards and expose its interior 83*a*. As soon as the screw 84 is screwed into the pressure yoke 83 once more, the springs 87 press against the underside of the pressure yoke 83 and clamp the conductors in position. The screw 84 can increase the clamping action when it is tightened to the stop.

When the screw 84 is turned clockwise with the conductor inserted, it goes slack when the conductor is pressed in position by the spring. With continued tightening (clockwise rotation) of the screw 84 the pressure yoke 83 becomes a tension yoke, since the screw end is supported on the contact strip 85 and draws the tension yoke upwards. The length of the screw 84 is thus preferably slightly smaller than the intermediate space between upper edge of the contact strip 85 and the lower edge of the recess 12 in the insulating housing.

By inserting socket connectors, strip conductors or printed circuit elements between the limb 90*a* of the clamping yoke 90 and the limb 85*a* of the contact strip 85 an electrical conductive connection is obtained.

A further modified embodiment of the same unitable strip conductor terminal 96 is shown in FIGS. 9, 10 and 11. In this case the U-shaped contact strip 85 is twisted through about 90° at 97*a* and its end is formed into two bifurcated tongues 98*a*, 98*b*. These bifurcated tongues 98*a*, 98*b* have projections 99*a*, 99*b* on their lower ends which establish a reliable contact with a socket connector, a flat contact or the like which is inserted and turned through 90°.

A further modified embodiment is shown in FIG. 14; it shows a spring pressure contact strip conductor terminal 105. In this embodiment a lower limb 106 of the contact strip 85 arranged laterally in the housing 107 and turned through 90°, and its end is formed with two bifurcated tongues 98*a*, 98*b*. An electric conductor may be inserted into the slot 88.

In the embodiment shown in FIG. 15 of the same spring pressure contact strip conductor terminal 108 modified as a safety contact terminal the upper limb 109 on the contact strip 85, which is also arranged laterally in the housing 110, has two bifurcated tongues 98*a*, 98*b*. The electric conductor in this case is also inserted from the opposite side through the insertion slot 88.

FIG. 16 shows a safety contact terminal in the form of a further modified embodiment of the same spring pressure contact strip conductor terminal 111. Herein, the housing 112 forms a trapezoidal body in which the limb 113 is bent vertically downwards and at the bottom end is adapted to be connected with a socket connector or the like. The conductor is inserted in a diagonal direction from above through the insertion slot 88.

A further modified embodiment is shown in FIG. 17 which is a safety contact terminal 114 similar to FIG. 12. In this embodiment a soldering lug 115 is passed through a foot 116 which is trapezoidal in side view, and acts as inserting socket, with an insulating housing 102.

FIG. 18 shows a safety contact terminal in the form of a strip conductor terminal 122 which has a U-shaped contact strip 124 in its housing 123 extending to the lateral edge of the housing 123 and is provided at the end (turned through about 90°) with two bifurcated tongues 89*a*, 89*b*. In the U-shaped part of the contact strip 124 there is a flat spring 125 which is bent around a pin 126 and one end is supporting below an upper limb 124*a* of the contact strip 124. The electric conductor is inserted above the pin 126 through the inserting slot 127.

The modification of FIG. 19 shows a strip conductor terminal 128 (safety contact terminal) formed in identical manner to the strip conductor terminal described in FIG. 18 except for a contact strip 130 bent Z-shaped and arranged in a modified housing 129.

FIG. 20 shows a further modified embodiment of a safety contact terminal in the form of a strip conductor terminal 131. In this case a straight contact strip 134, is located horizontally in the recess 133 in the centre of the housing 132. At one end of the contact strip 134 it is turned through 90° and formed into the two bifurcated tongues 98*a*, 98*b*. The opposite end of the contact strip 134 projects into a conically tapering inserting slot 135. Below and/or above the contact strip 134 flat springs 137*a*, 137*b* are located over pins 136, and their springy ends retain them in the recess 133.

The invention involves only simple manufacture, with many applications where contact connections are required. The springs of the individual terminals do not necessarily exert their pressure on the housing, but against the limbs of the U-shaped contact strips (see FIGS. 7, 9, 12, 14, 15, 16 and 18). In the embodiments shown in FIGS. 17, 19 and 20 the springs do exert pressure on the housing.

I claim:

1. A connecting terminal for electrically connecting two conductors, comprising:

a housing having first and second conductor receiving openings formed therein;

a contact strip having a U-shaped portion located within said housing and extending between said openings;

a pressure member located within said housing for clamping a first conductor inserted into said first opening against a leg of said U-shaped portion of said contact strip, said pressure member including:

a yoke embracing a first leg of said U-shaped portion of said contact strip and movable with respect to said first leg; and means for resiliently urging said yoke against said first leg for clamping said first conductor therebetween; and a pair of opposed contact members forming a socket within said housing to releasably receive a second conductor inserted into said second opening, at least one of said opposed contact members being integral with a leg of said U-shaped portion of said contact strip.

2. A connecting terminal according to claim 1 wherein the other of said opposed contact members is separate from said contact strip and further comprising biasing means for urging a surface of said other opposed member against a surface of said one opposed member, said second conductor being received between said surfaces.

3. A connecting terminal according to claim 1 wherein both of said opposed members are integral with a leg of said U-shaped portion of said contact strip.

4. A connecting terminal according to claim 3 wherein said opposed members are formed to resiliently yield when said second conductor is inserted therebetween to make a good electrical contact between said second conductor and said opposed members.

5. A connecting terminal according to claim 1 wherein said resiliently urging means includes a spring urging said yoke against said first leg.

6. A connecting terminal according to claim 5 wherein said spring is located between a second leg of said U-shaped portion and said yoke for resiliently urging said yoke against said first leg.

7. A connecting terminal according to claim 1 wherein said openings are funnel-shaped.

8. A connecting terminal according to claim 1 comprising at least one hole formed in one side of said housing and at least one projection formed on the other side of said housing, said holes and projections being dimensioned such that a plurality of connecting terminals can be assembled side by side by insertion of said projections on one housing into the corresponding holes of an adjacent housing.

9. A connecting terminal according to claim 1 wherein said yoke is movable perpendicularly to said first leg of said U-shaped member.

10. A connecting terminal for electrically connecting two conductors, comprising:

a housing having first and second conductor receiving openings formed therein;

a contact strip having a U-shaped portion located within said housing and extending between said openings, said U-shaped portion including a pair of leg portions and a member interconnecting said leg portions;

a pressure member located within the space formed by said pair of legs and connecting member of said U-shaped portion for clamping a first conductor inserted into said first opening against a leg of said U-shaped portion of said contact strip, said pressure member including a strip of spring metal biased towards said leg of said U-shaped portion and having a reentrant end with respect to said first opening; and a pair of resilient opposed contact members lying in substantially the same plane and being integral with a leg of said strip and forming a socket within said housing to releasably receive the second conductor inserted into said second opening, and the plane of said resilient contact members being substantially perpendicular to the plane of a broad face of said integral leg.

References Cited

UNITED STATES PATENTS

| | | | |
|---|---|---|---|
| 2,705,785 | 4/1955 | Benander | 339—95 X |
| 2,469,397 | 5/1949 | Mezek | 339—217 |
| 2,703,395 | 3/1955 | Long | 339—248 X |
| 2,950,457 | 8/1960 | Slater | 339—272 X |
| 3,358,261 | 12/1967 | Gaines et al. | 339—14 |
| 2,780,791 | 2/1957 | Morschel | 339—95 X |
| 3,259,876 | 7/1966 | Norden | 339—198 |

FOREIGN PATENTS

| | | |
|---|---|---|
| 1,386,072 | 12/1964 | France. |
| 53,754 | 5/1967 | Germany. |
| 1,048,291 | 8/1953 | France. |
| 41,845 | 11/1965 | Germany. |
| 856,012 | 11/1952 | Germany. |
| 1,067,097 | 10/1959 | Germany. |
| 891,610 | 3/1962 | Great Britain. |
| 366,575 | 2/1963 | Switzerland. |

OTHER REFERENCES

A–B Publication (Allen-Bradley Co.), "Bulletin 1492 Terminal Blocks," Nov. 1, 1961, p. 1.

RICHARD E. MOORE, Primary Examiner

U.S. Cl. X.R.

339—198, 248, 272